United States Patent
Endoh

(10) Patent No.: US 6,515,658 B1
(45) Date of Patent: Feb. 4, 2003

(54) 3D SHAPE GENERATION APPARATUS

(75) Inventor: Toshio Endoh, Kanagawa (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/553,317

(22) Filed: Apr. 20, 2000

(30) Foreign Application Priority Data

Jul. 8, 1999 (JP) ............................................. 11-194189

(51) Int. Cl.$^7$ ................................................ G06T 17/00
(52) U.S. Cl. ....................................... 345/419; 345/427
(58) Field of Search ................................. 345/418, 419, 345/420, 423, 424, 425, 427

(56) References Cited

U.S. PATENT DOCUMENTS 5,898,438 A * 4/1999 Stewart et al. ............... 345/419
6,169,817 B1 * 1/2001 Parker et al. ................ 345/419
6,297,825 B1 * 10/2001 Madden et al. .............. 345/419

FOREIGN PATENT DOCUMENTS

JP          9-134449          5/1997

* cited by examiner

*Primary Examiner*—Cliff N. Vo
(74) *Attorney, Agent, or Firm*—Staas & Halsey LLP

(57) ABSTRACT

A 3D shape generation apparatus is provided, which restores and generates 3D shapes with high precision and high efficiency, even when the shape is complex and has many feature points. If necessary, a captured image input portion for inputting a captured image, a feature point derivation portion for deriving feature points, and a visibility information derivation portion for deriving visibility information that indicates which feature points are visible from which capturing viewpoint precede an input portion. A feature point placement portion places 3D feature points in a virtual space. A visible face assigning portion assigns faces to the 3D feature points. Based on the visibility information, virtual lines are drawn between the feature points and the capturing viewpoints, and faces that intersect with the lines are eliminated because they should not be present, thereby attaining an approximate 3D shape. Instead of assigning visible faces, it is also possible to generate an initial shape by combining a convex hull of the 3D feature points or basic solid blocks, and eliminate unnecessary portions covering, for example, dent portions, using the visibility information.

15 Claims, 16 Drawing Sheets

(A)

(B)

(A)

(B)

(B)

(A)

(B)

(A)

(A)

(B)

(C)

(D)

(E)

3D SHAPE GENERATION APPARATUS

BACKGROUND OF THE INVENTION

1. Field of the Invention

The present invention relates to a 3D shape generation apparatus. More particularly, the present invention relates to a device for generating an objected captured in a camera image as a 3D shape on a display, based on camera images taken from a plurality of directions.

2. Description of the Prior Art

The increasing performance of computer systems in recent years and the progress in multimedia technology have led to a steadily improving environment for high-quality 3D computer graphics (referred to as "CG" in the following), even for use in personal computers. The question how a real object can be efficiently converted into 3D image data for a computer is an important problem for the structuring of systems, such as for electronic shopping, electronic libraries, etc., recreating objects realistically on a computer screen with 3D computer graphics technology.

The simplest method of generating data of a 3D object for a computer is to capture the 3D object from several directions to generate 2D image data, and to display the captured 2D image taken from the direction that is closest to the direction of the user on a display for reproduction. However, with this method, there is the problem that images of the 3D object from directions other than the directions from which the object has been captured cannot be displayed. Moreover, the images are 2D images after all, so that it is difficult to combine them with images of other 3D objects generated as 3D computer graphics data. To make it possible to display a captured 3D object from any direction, it is important to restore a 3D shape of the object as 3D image data, based on the 2D image data capturing the object from a plurality of directions, so that a projection image of the 3D shape can be generated and displayed for any direction.

Several methods have been proposed for restoring the 3D shape of an object as 3D image data from captured 2D image data. A prominent example is the method based on feature points. The generation of 3D image data with this method includes the following operations, illustrated by the flow-chart in FIG. 14. FIG. 15 illustrates the conventional principle of 3D image data generation based on feature points.

First of all, a captured image is read in, from which feature points are derived (operation 1401). For the derivation of these feature points, it is preferable that points where the brightness of the captured 2D image changes are selected as feature points. The feature points can be derived automatically by a computer searching for brightness changes, or they can be specified by hand. An example of a derivation of feature points is shown in FIG. 15. In this example, the four feature points shown in FIG. 15B are derived from the captured image in FIG. 15A.

Then, the correspondence of the derived feature points among the captured images is established (operation 1402). If the positional relation between the captured images, similarities among the images, and the positional relation between the derived feature points are utilized for establishing the correspondence among the feature points, operation 1402 can be processed automatically with a computer. Of course, the feature points also can be specified by hand. In the example in FIG. 15, the correspondence of the feature points 1 to 4 has been established as shown in FIG. 15C.

Then, the 3D coordinates of the feature points are determined by the principle of stereoscopy from the correspondence relation of the feature points (operation 1403), whereby each feature point is expressed as a point in 3D space.

Then, faces are assigned to the feature points arranged in 3D space, and a polyhedron is formed (operation 1404). Here, combinations of feature points defining a face are not arbitrary combinations, but have to be selected so as to form the outer surface of the object to be reproduced. In the example of FIG. 15, the faces are assigned as shown in FIG. 15D, forming a tetrahedron.

Then, textures are generated for the faces (operation 1405). For the generation of textures, it is possible to compute textures referring to the patterns on the captured images, and map them onto the faces.

With these operations S1401 to S1405, 3D image data can be generated from captured images. In the example of FIG. 15, 3D image data can be generated from the original 3D object, as shown in FIG. 15E.

On the other hand, the reproduction of the 3D object on a computer screen, using the generated 3D image data, includes the following operations, illustrated by the flow-chart in FIG. 16.

First of all, the position of the user with respect to the object is specified. That is, the direction and distance with respect to the object are specified (operation 1601).

Then, the position of each feature point on a projection plane corresponding to the direction and distance of the specified viewpoint with respect to the object is calculated, and a projection image is obtained (operation 1602). At this stage, texture mapping has not yet been performed.

Then, a texture is mapped on each face of the projection image (operation 1603). For the mapping of the texture, the texture is adjusted calculating the size, shape and direction of each projected face.

Finally, after applying the necessary special effects, such as lighting, tracing and shading, the 3D shape is displayed on a computer screen (operation 1604).

With these operations S1601 to S1605, a 3D object can be displayed from any direction on a computer screen, using the generated 3D image data.

Of the conventional 3D shape generation processing operations, the following methods are known for assigning faces to restore a 3D shape based on the feature point correspondences, shown as operation 1404 in FIG. 14. However, each of these methods poses problems, also described below.

A first conventional method for assigning faces is the projection of 3D feature points onto a surface of a known shape. This method projects the 3D feature points onto a developable surface with a known shape, such as a conical surface or a cylindrical surface, and uses the connections among the vertices, which have been determined before. This processing method is simple and can be regarded as an effective technique.

However, in this first processing method the 3D shape must be already known, or the projection center for the projection towards the developable surface, has to be determined in a manner that there is no pair of faces where the projection overlaps in the projection processing from the center point onto the developable surface. In other words, there is the problem that this method cannot be used for the case where there are complex 3D shapes of unknown shape including dents.

A second conventional method for assigning faces is to determine the direction of the normal on the faces using brightness information, and to assign faces so that this direction is the normal. With irradiation from the direction of a light source during the time of the projection, the brightness at the feature points on the faces of the 3D shape correlate to the direction of the normal of those faces, so that using brightness information, the directions of the normal on the faces at the 3D feature points can be determined, and the faces can be assigned.

However, this second processing method can be used only when the 3D shape is comparatively not complex, and it has no bumps or dents. That is to say, near bumps or dents, the brightness information changes abruptly, so that often the direction of the normal cannot be determined, or a wrong direction is determined for the normal, and there is the problem that this method cannot be used for those cases.

A third conventional method for assigning faces is to display the derived feature points on a display screen, and to specify some of those feature points by hand to determine the faces of the 3D shape. If the user specifies the feature points correctly, the 3D shape can be restored and generated without error.

However, in this third processing method, when the shape is complex and the number of faces and the number of feature points becomes large, the specification by the user becomes arduous, the processing time becomes extremely long, and the processing method is not practicable. Moreover, if the user does not know the 3D shape to be restored, it may be impossible to perform the method just by specifying feature points, and in this case, the specification has to be done while comparing the feature points with a projection image, which makes the operation even more arduous.

SUMMARY OF THE INVENTION

In light of the problems of conventional methods for 3D shape generation, it is an object of the present invention to provide a 3D shape generation apparatus that can realize the restoration of 3D shapes based on feature points with high precision and high efficiency, even when there are many feature points and the shape is complex.

A first 3D shape generation apparatus in accordance with the present invention restores and generates a 3D shape on a computer screen, based on data of feature points derived from a 3D shape and 2D image data of an outer surface of the 3D shape. This 3D shape generation apparatus comprises:

an input portion for inputting feature point information, capturing direction information, and visibility information, which represents the relation between a capturing direction and feature points that are visible from the capturing direction and appear in the captured image;

a feature point placement portion for placing the feature points in a virtual space, based on the feature point information;

a visible face assigning portion for assigning faces to the feature points that are visible from the capturing direction so that the feature points stay visible, based on the capturing direction information and the visibility information; and a 3D shape output portion for outputting and displaying a 3D shape that has faces assigned by said visible face assigning portion as its outer surface.

With this configuration, the assigning of faces to feature points can be performed in a simple and suitable manner, satisfying the visibility information of feature points and capturing viewpoints even for complex 3D shapes with bumps and dents. For the procedure of assigning faces satisfying the visibility information, lines passing through feature points toward the capturing directions from which the respective feature points are visible are drawn with respect to faces assigned to feature points that are visible from a capturing direction, when the lines intersect with an assigned faces, then the intersecting face is eliminated, and only the faces with which the drawn lines do not intersect are taken as the output of the visible face assigning portion. Moreover, when the faces of the Delaunay diagram of the feature points are taken as the faces to be assigned, a simple and fast algorithm can be employed. Here, "Delaunay" diagram means a set of tetrahedrons into which a convex hull has been partitioned.

A second 3D shape generation apparatus in accordance with the present invention restores and generates a 3D shape on a computer screen, based on data of feature points derived from a 3D shape and 2D image data of an outer surface of the 3D shape. This 3D shape generation apparatus comprises:

an input portion for inputting feature point information, capturing direction information, and visibility information, which represents the relation between a capturing direction and feature points that are visible from the capturing direction and appear in the captured image;

a feature point placement portion for placing the feature points in a virtual space, based on the feature point information;

a convex hull solid formation portion for forming a convex hull solid using the feature points;

a sight-obstructing solid part eliminating portion for eliminating parts of the solid that cover feature points that are visible from a capturing direction, based on the capturing direction information and the visibility information; and a 3D shape output portion for taking the solid remaining after the elimination with said sight-obstructing solid part eliminating portion as the 3D shape and outputting and displaying the 3D shape.

With this configuration, in the procedure for restoring the 3D shape based on feature points, first, a large frame for the 3D shape is formed in a simple and fast manner, using a convex hull of feature points, then, solid portions hiding feature points are eliminated based on the visibility information, whereby the restoration of a detailed shape with dents can be performed, and a 3D shape can be generated with high speed and high precision.

A third 3D shape generation apparatus in accordance with the present invention restores and generates a 3D shape on a computer screen, based on data of feature points derived from a 3D shape and 2D image data of an outer surface of the 3D shape. This 3D shape generation apparatus comprises:

an input portion for inputting feature point information, capturing direction information, and masking image information, which represents a capturing direction and a projected shape of an outer perimeter of the 3D shape seen from the capturing direction;

a 3D masking portion, which first generates a solid block aggregation filling a virtual space with basic solid blocks, and, based on the capturing direction information and the masking image information, eliminates basic solid blocks from the solid block aggregation that are outside the perimeter indicated by the masking image information when seen from a capturing direction; and a 3D shape output portion for outputting the remaining aggregation of basic solid blocks as a 3D shape and displaying the 3D shape.

A fourth 3D shape generation apparatus in accordance with the present invention restores and generates a 3D shape on a computer screen, based on data of feature points derived from a 3D shape and 2D image data of an outer surface of the 3D shape. This 3D shape generation apparatus comprises:

an input portion for inputting feature point information, capturing direction information, visibility information which represents the relation between a capturing direction and feature points that are visible from the capturing direction and appear in the captured image, and masking image information which represents a capturing direction and a projected shape expressing an outer perimeter of the 3D shape seen from the capturing direction;

a feature point placement portion for placing the feature points in a virtual space, based on the feature point information;

a 3D masking portion, which first generates a solid block aggregation filling a virtual space with basic solid blocks, and, based on the capturing direction information and the masking image information, eliminates basic solid blocks from the solid block aggregation that are outside the perimeter indicated by the masking image information when seen from a capturing direction;

a sight-obstructing solid part eliminating portion for eliminating basic solid blocks that cover feature points that are visible from a capturing direction, based on the capturing direction information and the visibility information; and a 3D shape output portion for outputting the remaining aggregation of basic solid blocks remaining after the elimination with said sight-obstructing solid part eliminating portion as a 3D shape and displaying the 3D shape.

With this configuration, in the procedure for restoring the 3D shape based on feature points, a large frame of the outer shape of the 3D shape is formed with an aggregation of basic solid blocks using masking image information, then, solid portions hiding feature points are eliminated based on the visibility information, whereby the restoration of a detailed shape with dents can be performed, and a 3D shape can be generated with high speed and high precision. For the elimination of basic solid blocks with the sight-obstructing solid part eliminating portion, it is preferable that lines are drawn from the capturing direction from which the feature points are visible to the feature points, and if the drawn lines intersect with the aggregation of basic solid blocks, the intersecting basic solid blocks are removed. It is also preferable that the basic solid blocks use tetrahedrons of a Delaunay diagram of the 3D feature points.

A first computer-readable recording medium storing a program for realizing a 3D shape generation apparatus in accordance with the present invention restores and generates a 3D shape on a computer screen, based on data of feature points derived from a 3D shape and 2D image data of an outer surface of the 3D shape. This program comprises:

an operation for inputting feature point information, capturing direction information, and visibility information, which represents the relation between a capturing direction and feature points that are visible from the capturing direction and appear in the captured image;

a feature point placement for placing the feature points in a virtual space, based on the feature point information;

a visible face assigning operation for assigning faces to the feature points that are visible from the capturing direction so that the feature points stay visible, based on the capturing direction information and the visibility information; and a 3D shape output operation for outputting and displaying a 3D shape that has the faces assigned in the visible face assigning operation as its outer surface.

A second computer-readable recording medium storing a program for realizing a 3D shape generation apparatus in accordance with the present invention restores and generates a 3D shape on a computer screen, based on data of feature points derived from a 3D shape and 2D image data of an outer surface of the 3D shape, the program comprising:

an operation for inputting feature point information, capturing direction information, and masking image information, which represents a capturing direction and a projected shape expressing an outer perimeter of the 3D shape seen from each capturing direction;

a 3D masking operation, which first generates a solid block aggregation filling a virtual space with basic solid blocks, and, based on the capturing direction information and the masking image information, eliminates basic solid blocks from the solid block aggregation that are outside the perimeter indicated by the masking image information when seen from each capturing direction; and a 3D shape output operation for outputting the remaining aggregation of basic solid blocks remaining after the elimination in the sight-obstructing solid portion eliminating operation as a 3D shape and displaying the 3D shape.

By reading such a program into a computer, a fast 3D shape generation apparatus with high restoration precision using visibility information of feature points of 3D shapes and capturing viewpoints can be implemented on the computer.

DESCRIPTION OF THE PREFERRED EMBODIMENTS

Figure 1:
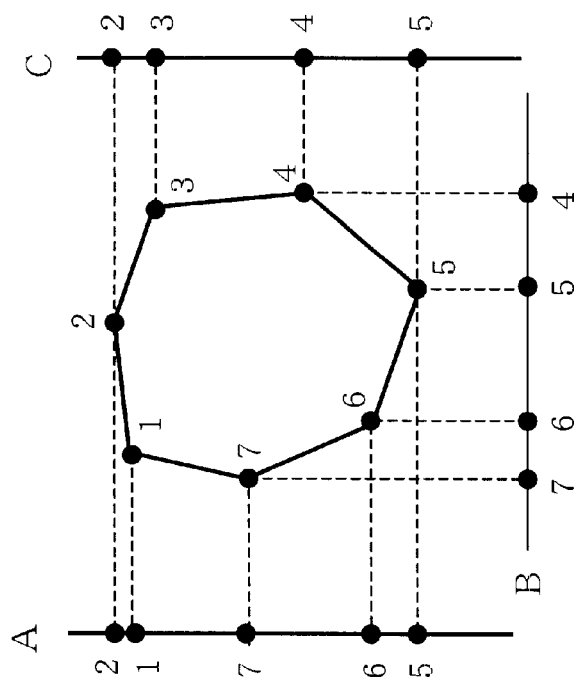
FIGS. 1A and 1B is a schematic drawing of the relation between a 3D shape having 3D feature points and the feature points of 2D images taken from various viewpoints, in accordance with the present invention.

Referring to the accompanying drawings, the following is a description of a preferred embodiment of a 3D shape generation apparatus in accordance with the present invention.

First of all, the basic principles of 3D shape generation based on visibility information with a 3D shape generation apparatus in accordance with the present invention are explained.

The 3D shape generation apparatus of the present invention forms a simple initial form based on 3D feature points of the 3D shape obtained as explained below, and eliminates unnecessary portions of the initial shape that do not satisfy the visibility information to increase the precision of the 3D shape.

First of all, the "visibility information" is explained. Generally, to reproduce a 3D shape on a display based on feature points derived from a captured image, the 3D feature points are often determined under mutual reference of 2D captured image data taken from various viewpoints, in order to reduce the influence of errors in the feature point derivation and the influence of errors in establishing the correspondence of the feature points. Also the 3D shape generation apparatus of the present invention uses 2D feature points derived from 2D captured image data taken from various viewpoints and 3D feature points obtained by establishing a correspondence among these 2D feature points. Let us suppose that the correspondence of feature points between the various viewpoints has been established, and the 3D feature points have been obtained. If there is a 2D feature point corresponding to a 3D feature point 1 in the captured image taken from a viewpoint A, the 3D feature point 1 can be seen when the 3D shape is viewed from viewpoint A. In other words, assuming that the captured object is not transparent, it can be said that there is no object obstructing the sight between viewpoint A and the 3D feature point 1.

FIG. 1A is a schematic drawing of the relation between a 3D shape having 3D feature points and the feature points of 2D images taken from various viewpoints. To keep the explanations simple, FIG. 1A shows a 2D plane slicing the 3D space at a certain height. The 3D shape has seven feature points 1 to 7 in this plane. The 2D captured images obtained from the viewpoints A to C can be understood as the projections into planes through the viewpoints, as shown in FIG. 1A. For example, this means that the feature points 2, 1, 7, 6 and 5 can be seen from viewpoint A, and on the other hand, only viewpoint A can be seen from the feature point 1, whereas viewpoint A and viewpoint B can be seen from the feature point 7. In this specification, the visibility relation between the feature points and the viewpoints is called "visibility information". This visibility information can be listed in a visibility information table, as is shown in FIG. 1B, which corresponds to the example in FIG. 1A.

The following explains how the initial shape is formed.

The following is an example of an initial shape using a set of 3D feature points and an example of how unnecessary portions can be eliminated using the visibility information, in accordance with the present invention.

Figure 2:
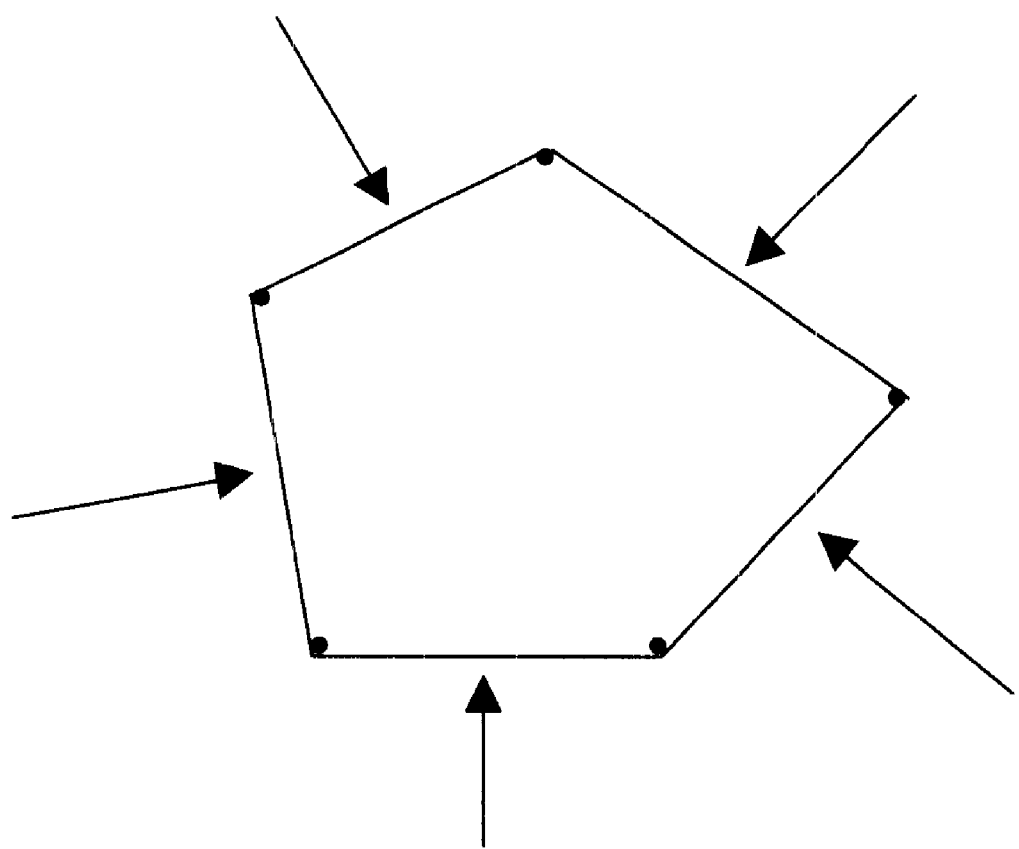
FIG. 2 is a 2D drawing of how a convex hull is formed in accordance with the present invention.

As an example of the first initial shape, a convex hull of a set of 3D feature points is considered. A convex hull of a set of 3D feature points is a convex polyhedron that is attained by arranging a number of 3D feature points in 3D space and shrinking a big rubber balloon including all 3D feature points on its inside as far as possible over the 3D feature points. FIG. 2 is a 2D drawing of how a convex hull is formed. With this kind of convex hull formation, when the actual 3D shape is complicated and tangled or has dents, the inner feature points will be hidden inside the convex hull, but it is easy to form a coarse outer frame of the 3D shape. This convex hull is taken as the initial shape, and then unnecessary portions covering complex portions and dents that cannot be expressed with the convex hull are eliminated using the visibility information explained below.

Figure 3:
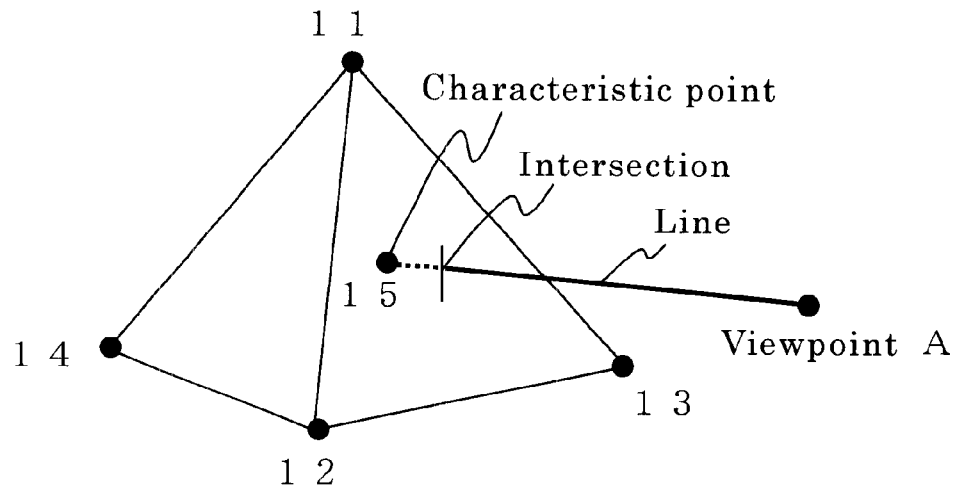
FIGS. 3A and 3B illustrates the procedure for eliminating unnecessary portions in accordance with the present invention, taking the convex hull of the set of 3D feature points as the initial shape.
Figure 3:
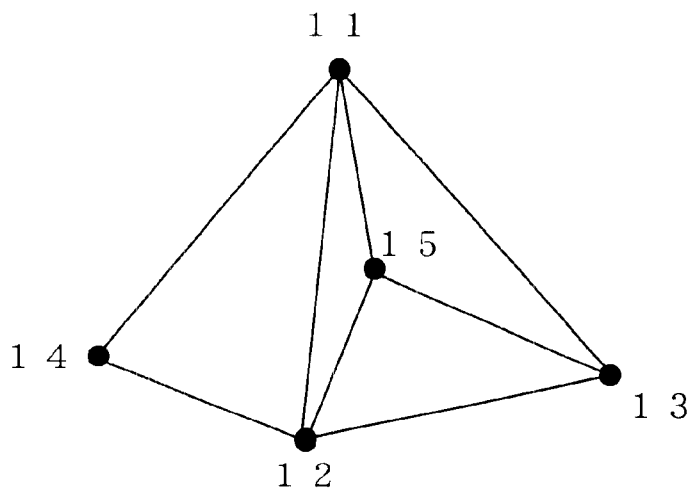

A procedure for eliminating unnecessary portions taking the convex hull of a set of 3D feature points as the initial shape can be performed as follows. To keep the explanations simple, the following example relates to a tetrahedron having the feature points 11, 12, 13, and 14 at its vertices, as shown in FIG. 3. Now, if the feature point 15, which is not a vertex of the convex hull, has the viewpoint A as its visibility information, then the feature point 15 is hidden inside the polyhedron, as shown in FIG. 3A. A line is drawn between the feature point 15 and the viewpoint A. Originally, there should be no object obstructing the view on that line, and it can be concluded that the face 11-12-13 intersecting this line should not be formed. Thus, the polyhedron 11-12-13-15 is eliminated, and a 3D shape having a dent is attained, as shown in FIG. 3B.

Repeating this basic procedure of eliminating unnecessary portions, an approximate 3D shape connecting the set of 3D feature points derived from the captured images can be obtained even for complicated 3D shapes.

As an example of a second initial shape and procedure of eliminating unnecessary portions, a large frame for the initial shape is formed by combining basic solid blocks, and unnecessary basic solid blocks are eliminated using the visibility information. There are several methods of how the initial shape can be made by combining basic solid blocks.

Figure 4:
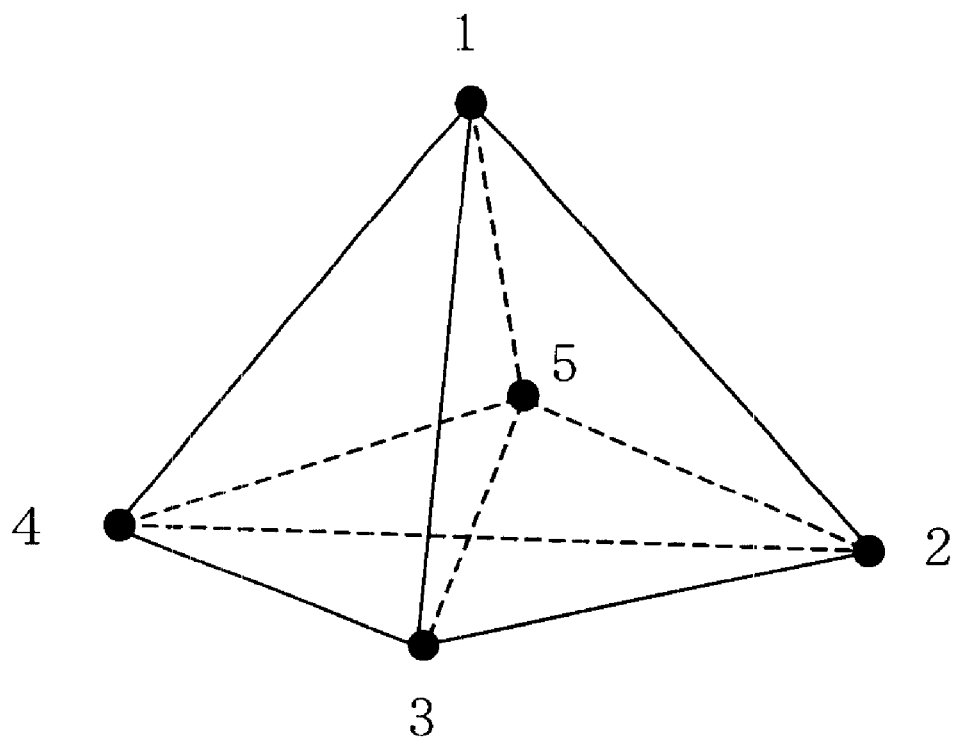
FIG. 4 illustrates the idea of forming small tetrahedrons with Delaunay diagrams of a set of 3D feature points, and taking these small tetrahedrons as the basic solid blocks.

A first example of combining basic solid blocks is to form small tetrahedrons using a Delaunay diagram of the set of 3D feature points, and to take these tetrahedrons as the basic solid blocks. Here, a "Delaunay diagram" means a convex hull broken down into a set of tetrahedrons. FIG. 4 shows an example of a Delaunay diagram. The example in FIG. 4 shows a Delaunay diagram with five feature points. Thus, it consists of the four basic small tetrahedrons 1-2-3-5, 1-3-4-5, 1-2-4-5, 2-3-4-5. Then, the procedure of eliminating unnecessary portions is performed by eliminating tetrahedrons located between feature points and the viewpoint, for which the visibility information is used.

The above model of basic solid blocks based on a Delaunay diagram can be understood as a regular solid model. In this case, the inside and the outside of the object are defined as a result of the restoration. However, in actual procedures for restoring 3D shapes, surface models, for which only the outer surface of the captured object is defined, are often sufficient. Consequently, it is not always necessary to treat the initial shape using the Delaunay diagram as a solid model, and it is also possible to think of FIG. 4 as a set of faces using a Delaunay diagram. This way, the concept of the initial shape includes not only solid models, but also surface models. Also in the case of surface models, the procedure for eliminating unnecessary portions (unnecessary faces) is performed by eliminating faces between feature points and viewpoints, using the visibility information. In the output for a surface model, only those faces are selected and output, that form the outer surface which can be observed from the outside, because faces on the inside are unnecessary. One method for determining whether a face is part of the outer surface is to determine the number of polyhedrons including the face. If a face is shared by two polyhedrons, it is an inner face, and if it is included in only one polyhedron, it is a part of the outer surface.

Figure 5:
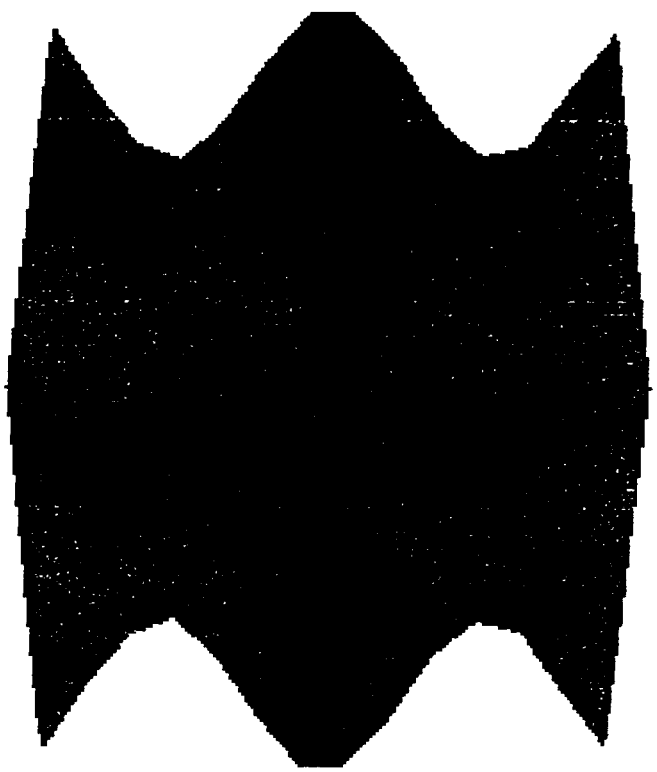
FIG. 5A shows an example of a 3D shape.
FIG. 5B shows an example of a 3D masking shape.
Figure 5:
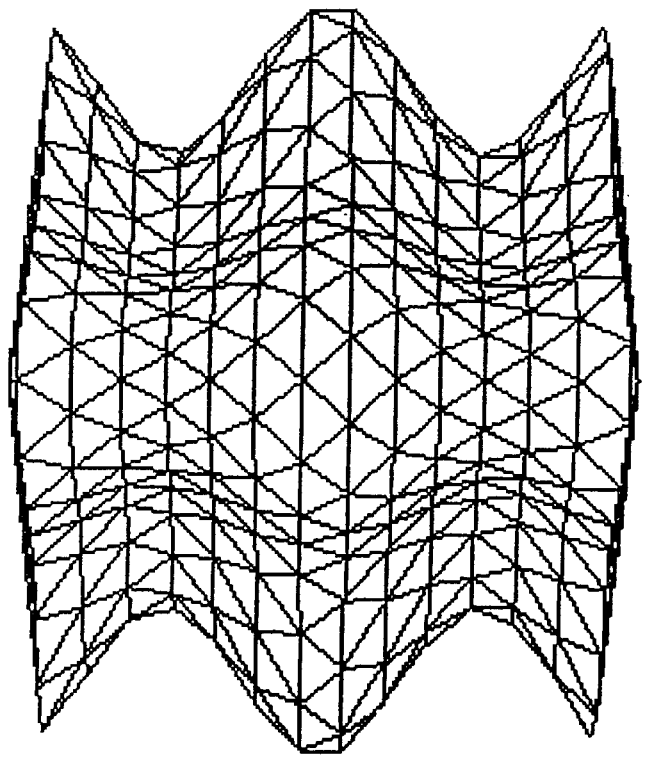

A second example of combining basic solid blocks is to use cubes, regular tetrahedrons, regular octahedrons, or regular dodecahedrons with a predetermined unit length for the basic solid blocks. A method for obtaining the initial shape from these basic solid blocks is to generate an approximate 3D shape with masking images. In this specification, "masking image" refers to an image where the value of the pixels for the 3D shape portions of the image captured from each viewpoint is "1", and the value of the pixels corresponding to the background is "0". As a method for generating the masking images automatically, there are methods detecting the contour (edges) of the 3D shape, and methods that prepare two captured images, namely one image taken with the 3D shape and one image taken without the 3D shape, and compare each pixel to derive the portion where there is a large difference. It is preferable that the masking images are prepared before the procedure of deriving the feature points. Because the feature point derivation procedure does not distinguish 3D shape portions of the image from the background portions, the feature points in the background portion will be derived as well, if the derivation procedure is performed on an unprocessed captured image, but if the portions of the captured image outside the region of the masking portion are eliminated beforehand, the procedure of deriving the feature points can be omitted for the background portion. FIG. 5A shows an example of a captured 3D shape. To keep the explanations simple, the example in FIG. 5A has been drawn as a wire frame model by a computer graphics program. Moreover, the drawing is shown only from one side. FIG. 5B shows a mask shape for the 3D shape in FIG. 5A. It is preferable to obtain plurality of mask images taken from various angles, but to keep the explanations simple, only one mask image taken from one viewpoint is shown here.

Figure 7:
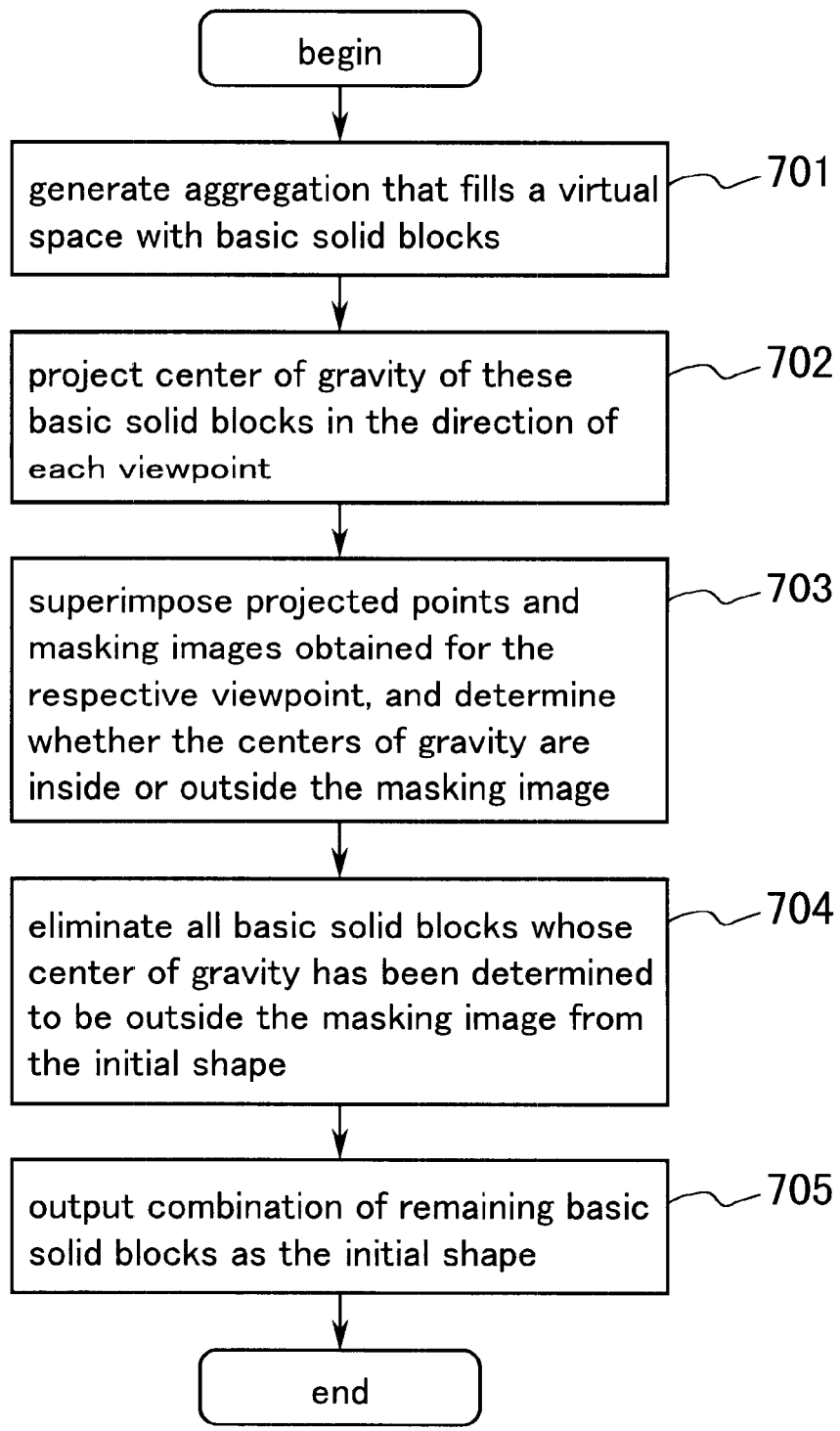
FIG. 7 shows a procedure for obtaining an initial shape from the basic solid blocks.

A procedure for obtaining an initial shape from the basic solid blocks is shown in FIG. 7.

Figure 6:
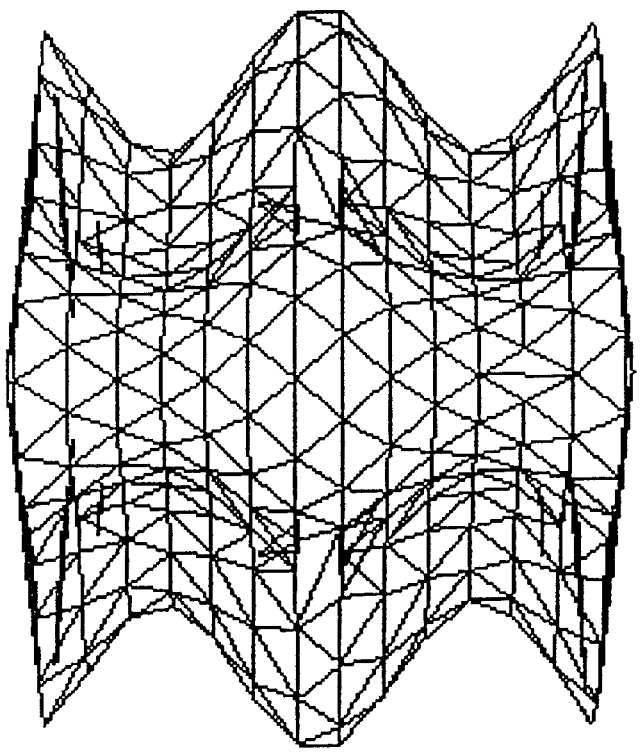
FIG. 6A shows an initial shape generated with the 3D masking procedure.
FIG. 6B shows the result of the procedure of eliminating unnecessary portions from this initial portion, using visibility information.
Figure 6:
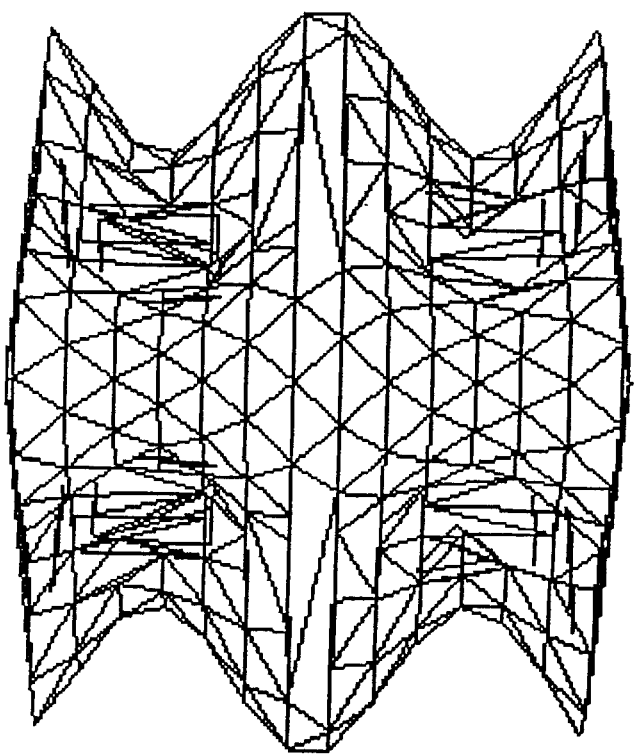

First of all, a solid block aggregation filling a virtual space with basic solid blocks is assumed (operation 701). Then, the centers of gravity of these basic solid blocks are projected in the direction of each viewpoint (operation 702). The projected points and the masking images obtained for the respective viewpoint are superimposed, and it is determined, whether the centers of gravity are inside or outside the masking images (operation 703). All basic solid blocks whose center of gravity has been determined by operation 703 to be outside the masking images for at least one viewpoint are eliminated from the initial shape (operation 704). The combination of basic solid blocks remaining after the elimination procedure of operation 704 is given out as the initial shape (operation 705). In other words, the point of this procedure for obtaining the initial shape from the basic solid blocks is that those basic solid blocks are eliminated from the solid block aggregation that are outside the perimeter indicated by the masking image information when seen from the direction the picture was taken, based on the capturing direction information and the masking information. Throughout this specification, this procedure is called "3D masking procedure". With this 3D masking procedure, a 3D aggregation is obtained that approximates a set of basic solid blocks of the 3D shape. FIG. 6A shows the approximate 3D shape serving as the initial shape generated with the 3D masking procedure is, using the masking image of FIG. 5B.

Figure 8:
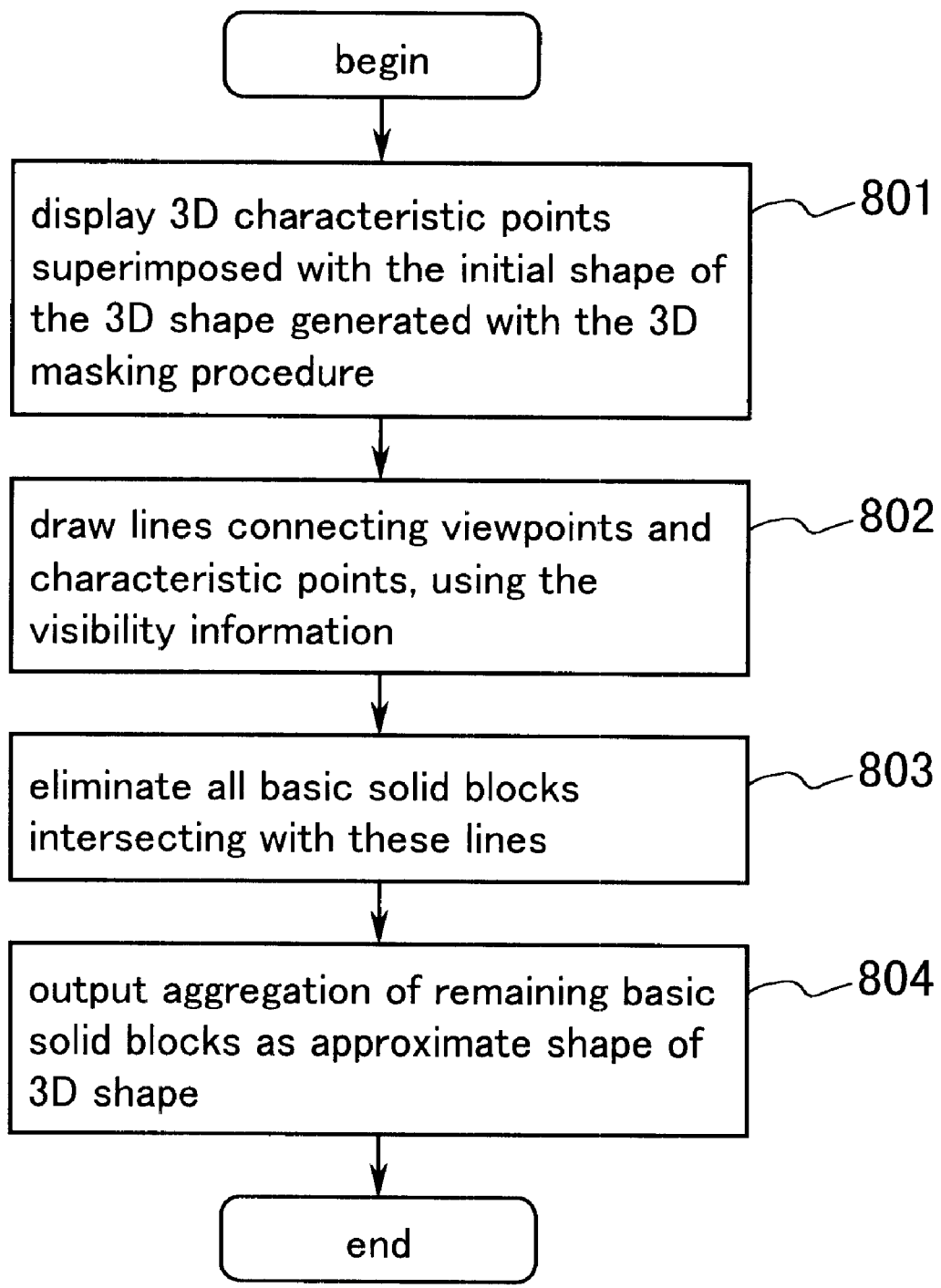
FIG. 8 is a flowchart of a procedure for eliminating unnecessary portions in the initial shape of the 3D shape obtained with the masking procedure.

FIG. 8 is a flowchart of a procedure for eliminating unnecessary portions in the initial shape of the 3D shape obtained with the masking procedure. First of all, the 3D feature points obtained from the captured image are superimposed on the initial shape of the 3D shape generated with the 3D masking procedure and displayed (operation 801). Then, using the visibility information, lines connecting the viewpoints and the feature points are drawn (operation 802). Then, all basic solid blocks intersecting with these lines are eliminated (operation 803). The aggregation of the remaining basic solid blocks is output as the approximate shape of the 3D shape (operation 804).

The result of the procedure of eliminating unnecessary portions from the approximate 3D aggregation, which is the initial shape in FIG. 6A, using the visibility information is shown in FIG. 6B. It can be seen that the approximate 3D shape after the procedure of eliminating unnecessary portions in FIG. 6B is more precise than the approximate 3D shape of the initial shape in FIG. 6A.

If the 3D shape to be restored is a simple shape without dents, then, of course, the initial shape generated with the 3D masking procedure can be taken as the approximated shape of the 3D shape.

The following is an explanation of an embodiment applying the basic principle of this procedure for generating 3D shapes.

First Embodiment

A 3D shape generation apparatus in accordance with a first embodiment of the present invention uses 3D feature point information and visibility information obtained from captured images, places the 3D feature points in a virtual 3D space, assigns faces to the 3D feature points so as to satisfy the visibility information, and outputs these faces as the faces of an approximate 3D shape.

Figure 9:
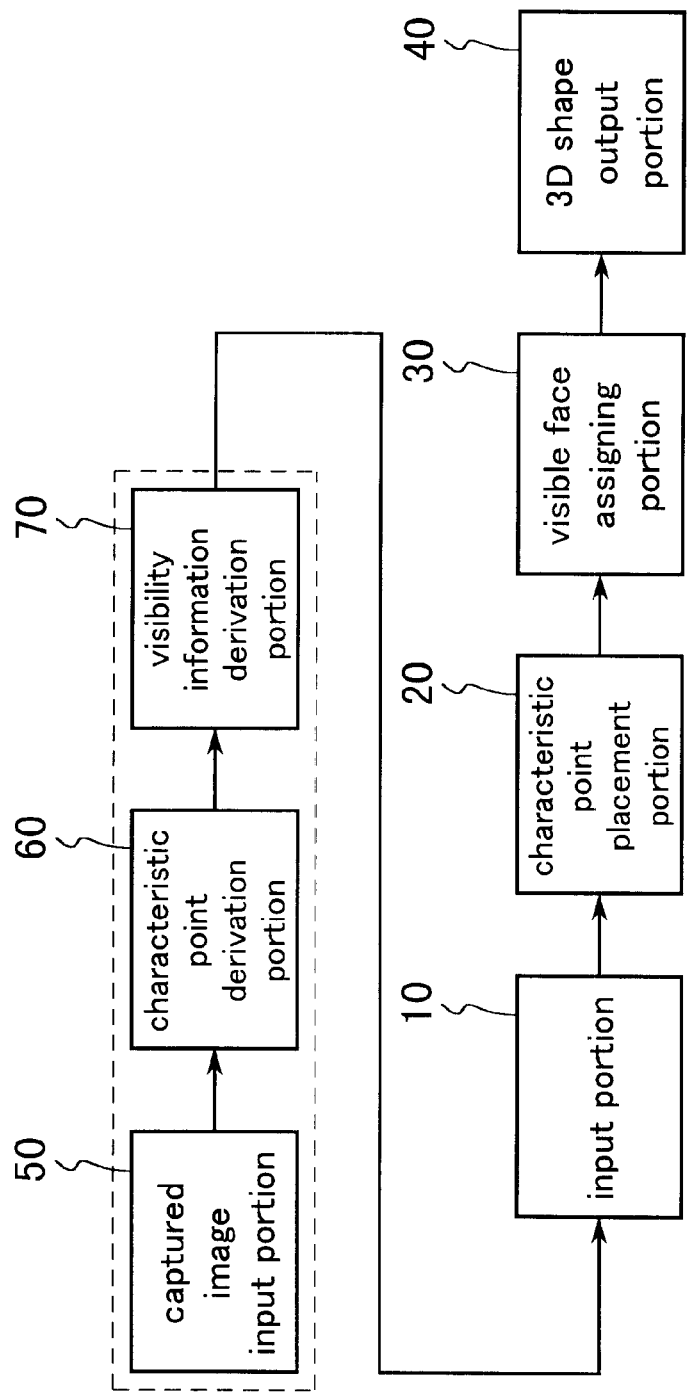
FIG. 9 shows an example of the configuration of a 3D shape generation apparatus in accordance with the first embodiment of the present invention.

FIG. 9 shows an example of the configuration of a 3D shape generation apparatus in accordance with the first embodiment. In FIG. 9, numeral 10 denotes an input portion, numeral 20 denotes a feature point placement portion, numeral 30 denotes a visible face assigning portion, and numeral 40 denotes a 3D shape output portion. Preceding the input portion 10, this first embodiment also includes a captured image input portion 50, a feature point derivation portion 60, and a visibility information derivation portion 70.

The 3D feature point information and the visibility information are input with the input portion 10. It is assumed that the visibility information is input together with the information of the capturing direction. If the 3D feature point information and the visibility information of the 3D shape are available to begin with, the elements preceding the input portion 10 are not necessary, but this first embodiment does include these elements for deriving this kind of information.

The captured image input portion 50 is the portion into which 2D captured images of the 3D shape are input.

The feature point derivation portion 60 derives the feature points of the 3D shape on the 2D captured images that have been input. As has been explained as the general principle of the method for deriving feature points, the places where the brightness in the 2D captured images has changed are selected with a computational procedure, the correspondences among a plurality of captured images are established, and 3D coordinates are determined with the principle of stereoscopy. It is also possible to manually select the edges and vertices of the images to establish the correspondences.

The visibility information derivation portion 70 derives the visibility information, depending on the correspondence established among the feature points, and with the method for deriving visibility information, whose general principle has been explained with FIG. 1, a visibility information table (FIG. 1B) is derived from the capturing directions in which there are 2D feature points corresponding to the 3D feature points (FIG. 1A).

The 3D feature point information and the visibility information derived with the feature point derivation portion 60 and the visibility information derivation portion 70 as well as the information of the capturing directions are given to the input portion 10.

Based on the feature point information, the feature point placement portion 20 places the 3D feature points in a virtual space. The 3D shape is approximately restored by assigning faces to the 3D feature points placed in the virtual space.

Based on the capturing direction information and the visibility information, the visible face assigning portion 30 assigns faces to the feature points that are visible from the capturing directions, so that the feature points are visible. The faces should be assigned to the feature points so that there are no conflicts with the visibility information. To give an example of the procedure for assigning the faces with the visible face assigning portion 30, first, all faces are assigned to the 3D feature points. For the faces, it is possible to take faces of the Delaunay diagram between the feature points as shown in FIG. 4, explained for the basic principle. Then, based on the visibility information, lines are drawn from the capturing direction from which the feature points are visible to the feature points, and if these lines intersect with the assigned faces, then those intersecting faces are eliminated, leaving only the not intersecting faces. This procedure is performed for all visibility information.

If not the entire periphery of the 3D shape can be covered with the captured images that have been input and a portion is in a dead angle, it may not be possible to decide the suitability of all faces with the visibility information. In such cases, it is possible to after-process these portions by hand, or to introduce a certain standard, such as preferably leaving faces with large areas.

The 3D shape output portion 40 takes the faces assigned by the visible face assigning portion 30 as the outer faces, and outputs and displays them as the 3D shape.

Thus, the 3D shape generation apparatus of the first embodiment uses 3D feature point information and visibility information obtained from captured images, assigns faces to the 3D feature points so as to satisfy the visibility information, and thereby attains the faces of an approximate 3D shape.

Second Embodiment

A 3D shape generation apparatus in accordance with a second embodiment of the present invention uses 3D feature point information and visibility information obtained from captured images, generates a convex hull of 3D feature points as an initial shape, and, using the visibility information, eliminates complicated portions and dents that cannot be expressed with the convex hull serving as the initial shape, so as to generate an approximate 3D shape solid.

Figure 10:
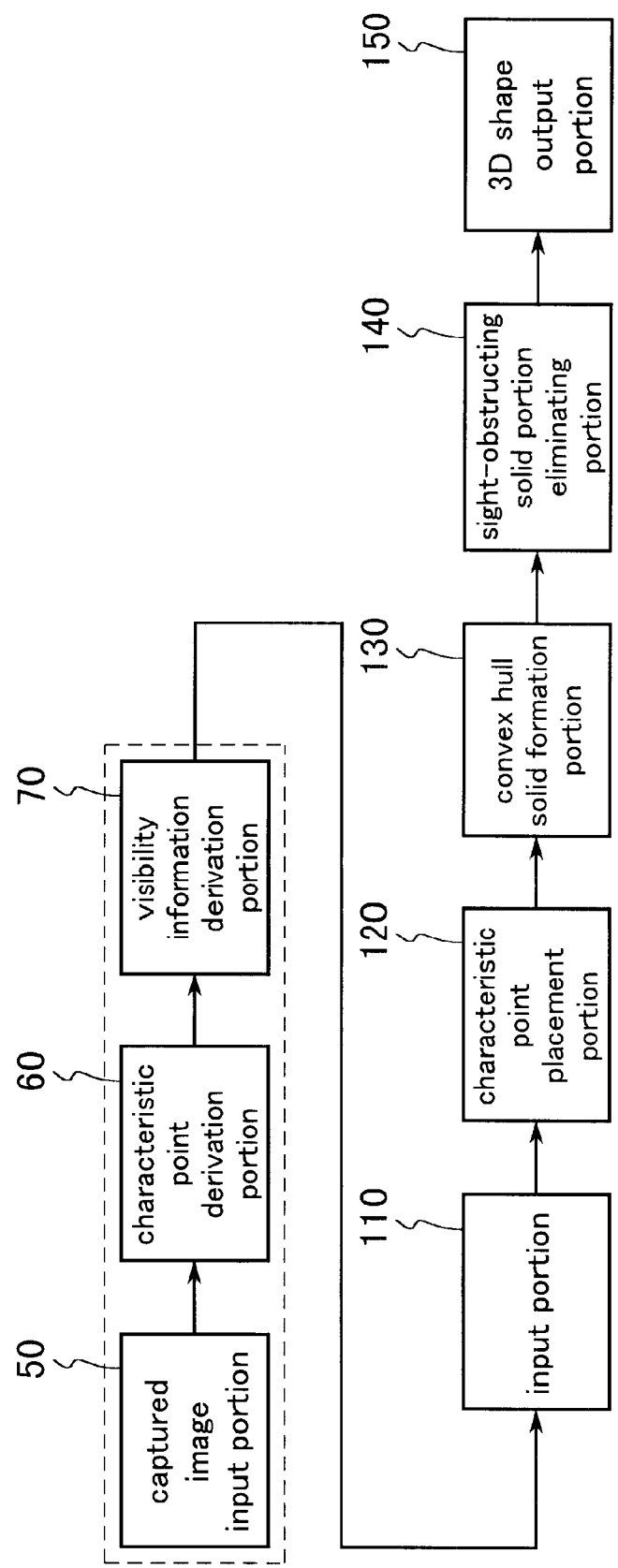
FIG. 10 shows an example of the configuration of a 3D shape generation apparatus in accordance with the second embodiment of the present invention.

FIG. 10 shows an example of the configuration of a 3D shape generation apparatus in accordance with the second embodiment. In FIG. 10, numeral 110 denotes an input portion, numeral 120 denotes a feature point placement portion, numeral 130 denotes a convex hull solid formation portion, numeral 140 denotes a sight-obstructing solid part eliminating portion, and numeral 150 denotes a 3D shape output portion. As in the first embodiment, the second embodiment also can have a captured image input portion 50, a feature point derivation portion 60, and a visibility information derivation portion 70, preceding the input portion 110.

The 3D feature point information and the visibility information are input with the input portion 110. The input 3D feature point information, the visibility information, and the capturing direction information are the same as in the first embodiment. As in the first embodiment, if the 3D feature point information and the visibility information of the 3D shape are not available from the beginning, it is preferable that the second embodiment also includes a captured image input portion 50, a feature point derivation portion 60, and a visibility information derivation portion 70 as the elements for deriving this information.

Based on the feature point information, the feature point placement portion 120 places the 3D feature points in a virtual space.

Figure 11:
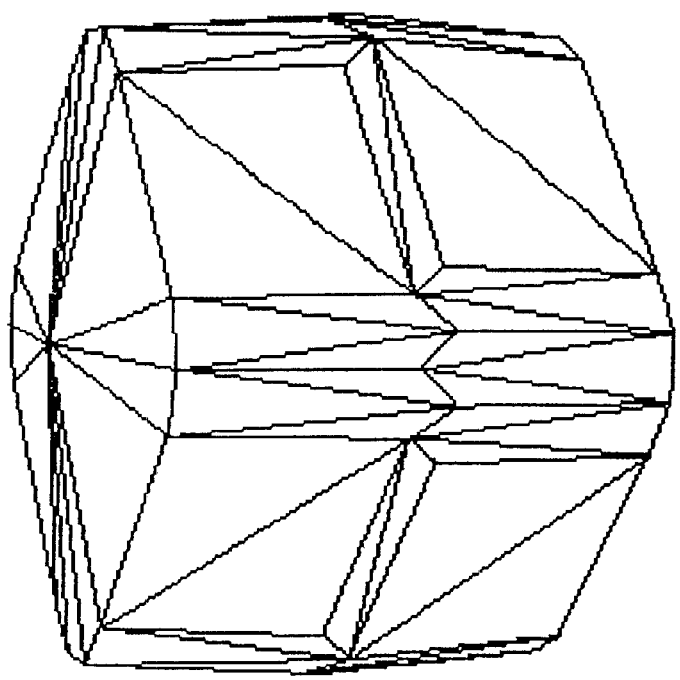
FIG. 11A is a front image of an example of a convex hull formed from the feature points derived from the 3D shape in FIG. 5A.
FIG. 11B is an image of the same, taken obliquely from above.
Figure 11:
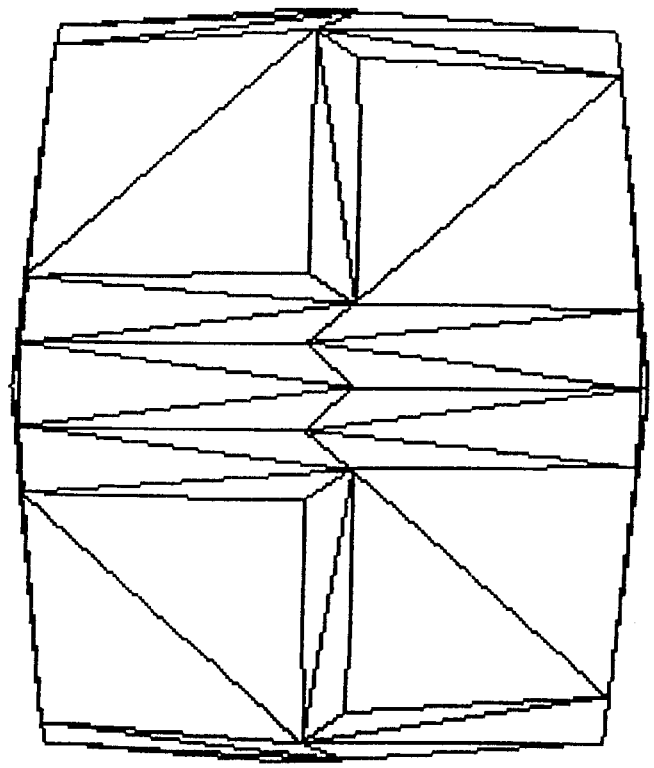

The convex hull solid formation portion 130 forms a convex hull from the set of 3D feature points arranged in the virtual space, and generates the initial shape. The basic principle for forming the convex hull is as shown in FIG. 2. FIG. 11A (front image) and FIG. 11B (image taken obliquely from above) show an example of a convex hull formed from the feature points of the 3D shape shown in FIG. 5A.

The sight-obstructing solid part eliminating portion 140 eliminates unnecessary portions from the convex hull of the initial shape, using the visibility information. The elimination procedure is performed for all visibility information with the procedure whose basic principle is illustrated in FIG. 3. When, based on the visibility information, all unnecessary sight-obstructing solid portions have been eliminated from the convex hull in FIG. 11A, the image in FIG. 6B is attained, like in the first embodiment.

The 3D shape output portion 150 outputs the approximate 3D shape, wherein unnecessary solid portions have been eliminated from the convex hull serving as the initial shape, using the visibility information.

If not the entire periphery of the 3D shape can be covered with the captured images that have been input and a portion is in a dead angle, it may not be possible to decide about some of the unnecessary portions on the convex hull with the visibility information. In such cases, it is possible to after-process these portions by hand, or to introduce a certain standard, such as preferably leaving the shape of the convex hull as is.

Thus, the 3D shape generation apparatus of the second embodiment uses 3D feature point information and visibility information obtained from captured images, takes a convex hull formed from a set of 3D feature points as the initial shape, and eliminates unnecessary solid portions on the convex hull using the visibility information, so as to generate an approximate 3D shape solid.

Third Embodiment

A 3D shape generation apparatus in accordance with a third embodiment of the present invention uses 3D feature point information, visibility information, and masking image information obtained from captured images, generates an initial shape of basic solid blocks using the masking image information, and, using 3D feature point information displayed superimposed with the initial shape and visibility information, eliminates unnecessary basic solid block portions of the initial shape, so as to generate an approximate 3D shape solid.

Figure 12:
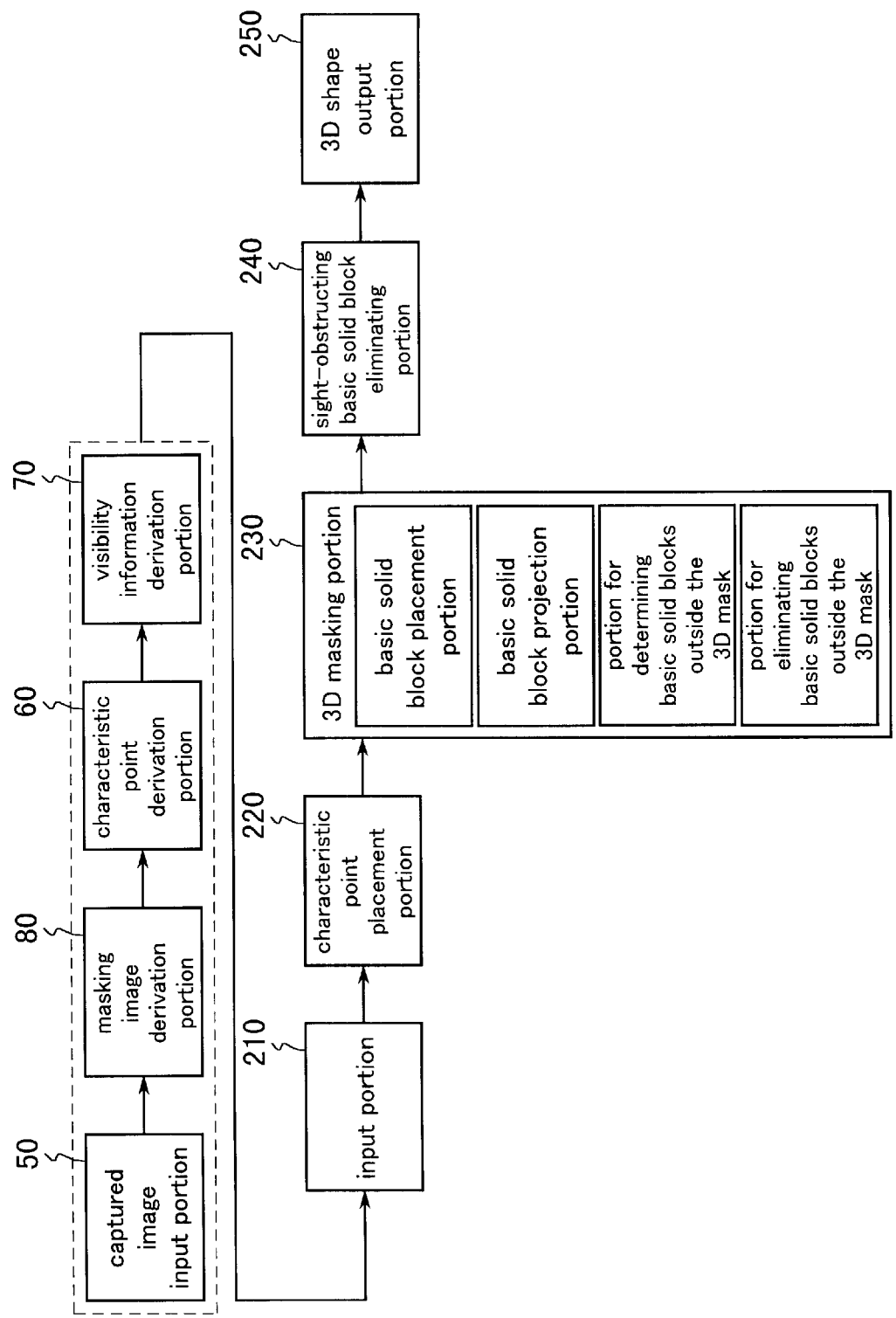
FIG. 12 shows an example of the configuration of a 3D shape generation apparatus in accordance with the third embodiment of the present invention.

FIG. 12 shows an example of the configuration of a 3D shape generation apparatus in accordance with the third embodiment. In FIG. 12, numeral 210 denotes an input portion, numeral 220 denotes a feature point placement portion, numeral 230 denotes a 3D masking portion, numeral 240 denotes a sight-obstructing basic solid block eliminating portion, and numeral 250 denotes a 3D shape output portion. The third embodiment also can have a captured image input portion 50, a masking image derivation portion 80, a feature point derivation portion 60, and a visibility information derivation portion 70, preceding the input portion 210.

The 3D feature point information, the visibility information, and the masking image information are input with the input portion 210. The 3D feature point information, the visibility information, and the capturing direction information are the same as in the first embodiment. The masking information has been explained together with the basic principles, and is as shown in FIG. 5B. Also in this third embodiment, if the 3D feature point information, the visibility information, and the masking image information of the 3D shape are not available from the beginning, the third embodiment includes a captured image input portion 50, a feature point derivation portion 60, a visibility information derivation portion 70, as well as a masking image derivation portion 80 as the elements for deriving this information. As has been explained for the basic principle, the masking image derivation portion 80 derives the masking images with a method of detecting the contour (edges) of the 3D shape, or a method that prepares two captured images, namely one image taken with the 3D shape and one image taken without the 3D shape, from which the portions with large differences are derived. The 3D feature point information, the visibility information, the capturing direction information, and the masking images derived with the masking image derivation portion 80, the feature point derivation portion 60, and the visibility information derivation portion 70 are given into the input portion 210.

Based on the feature point information, the feature point placement portion 220 places the 3D feature points in a virtual space.

The 3D masking portion 230 generates an initial shape combining basic solid blocks, and includes a basic solid block placement portion 231, a basic solid block projection portion 232, a portion 233 for determining basic solid blocks outside the 3D mask, and a portion 234 for eliminating basic solid blocks outside the 3D mask. The procedure for generating an initial shape performed by the 3D masking portion 230 is the same as explained in FIG. 7 for the general principle. The basic solid block placement portion 231 takes an aggregation of basic solid blocks as structural units filling a virtual space, and the basic solid block projection portion 232 projects the centers of gravity of the basic solid blocks into the direction of the viewpoints. The portion 233 for determining basic solid blocks outside the 3D mask judges those basic solid blocks that are outside the mask image as unnecessary portions. The portion 234 for eliminating basic solid blocks outside the 3D mask eliminates the basic solid blocks that have been judged to be unnecessary portions, thereby obtaining the initial shape. Possible basic solid blocks are regular tetrahedrons, cubes, regular octahedrons, and regular dodecahedrons or the tetrahedrons of the Delaunay diagram.

The sight-obstructing basic solid block eliminating portion 240 eliminates unnecessary basic solid blocks from the basic solid block aggregation of the initial shape, using the visibility information. The elimination applies the procedure explained in FIG. 8 of the basic principle to all visibility information. Thus, all basic solid blocks covering visible feature points are eventually eliminated.

When all unnecessary basic solid blocks have been eliminated from the initial shape, the 3D shape output portion 250 outputs the approximate 3D shape.

If not the entire periphery of the 3D shape can be covered with the captured images that have been input and a portion is in a dead angle, it may not be possible to decide the suitability of all faces with the visibility information. In such cases, it is possible to after-process these portions by hand, or to introduce a certain standard, such as preferably leaving the initial shape as is.

Thus, the 3D shape generation apparatus of the third embodiment uses 3D feature point information, visibility information, and masking image information obtained from captured images, generates an initial shape of basic solid blocks using the masking image information, and eliminates unnecessary solid block portions of the initial shape using the 3D feature points displayed superimposed on the initial shape, and the visibility information, so as to generate an approximate 3D shape solid.

Fourth Embodiment

Figure 13:
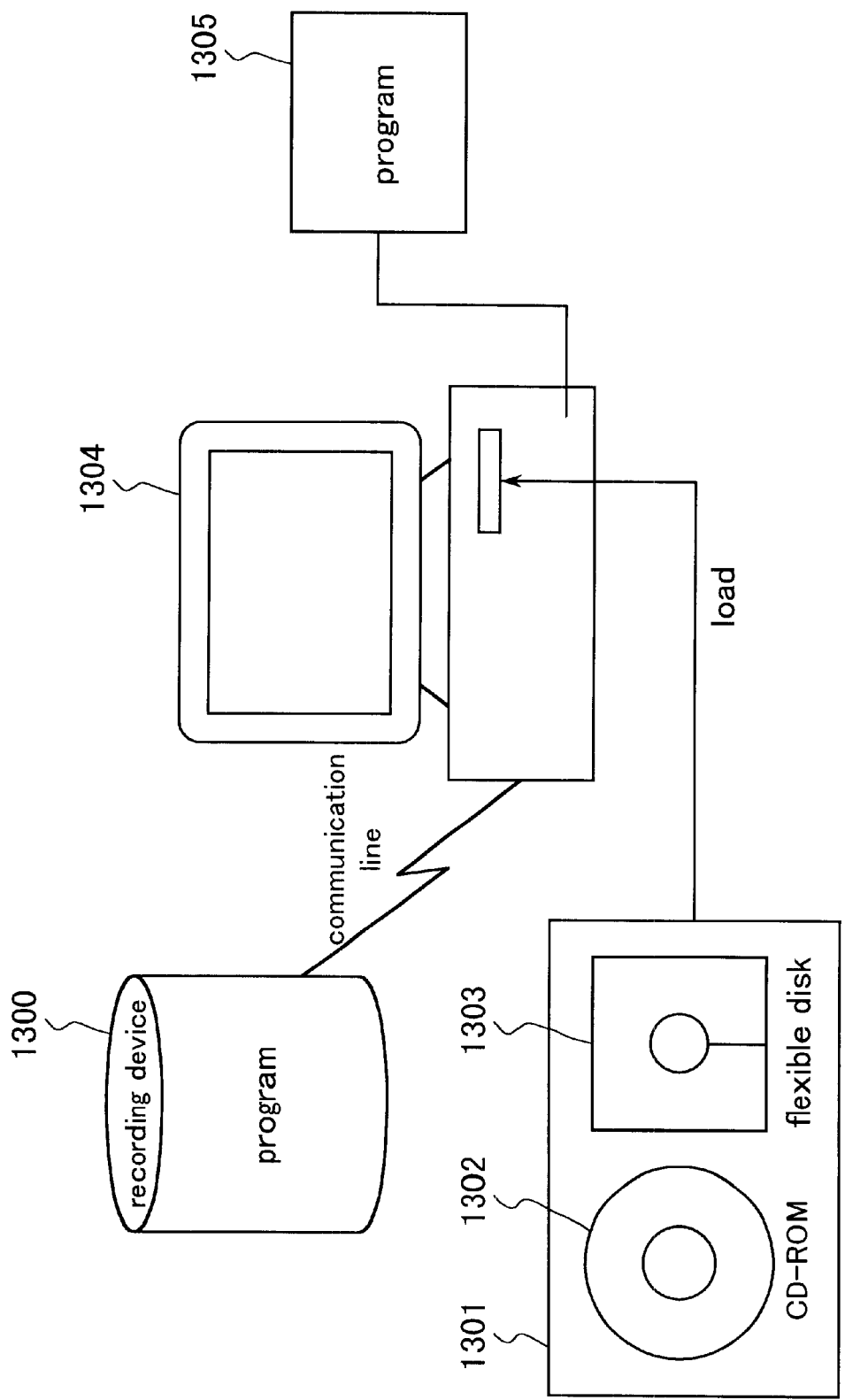
FIG. 13 shows examples of recording media and a system configuration using a program on these recording medium.
Figure 14:
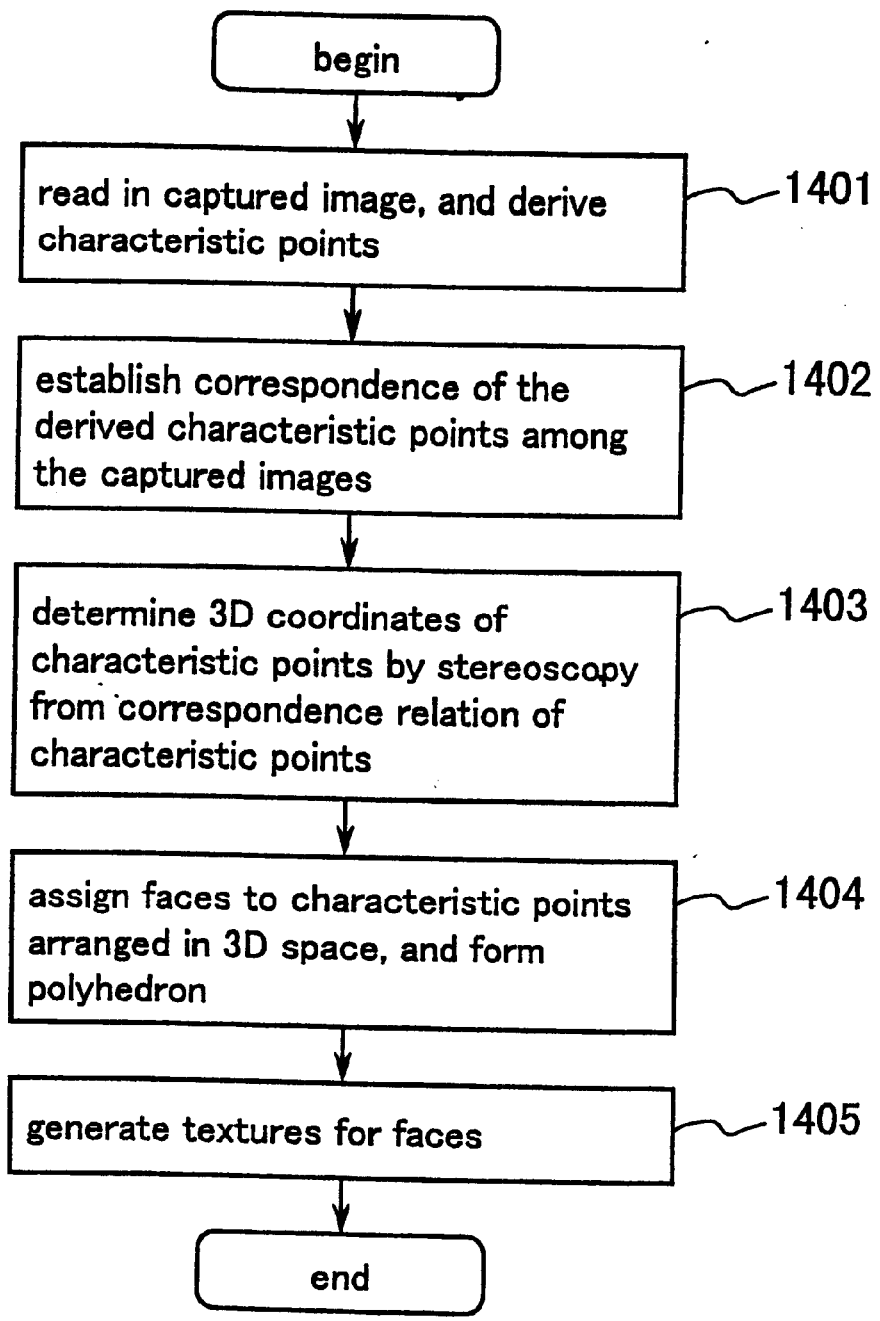
FIG. 14 is a flowchart of a conventional texture image generation processing operations.
Figure 15:
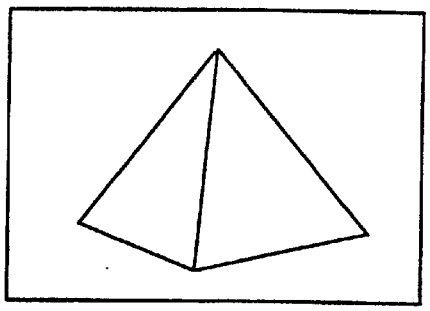
FIG. 15 illustrates the conventional idea of 3D image data generation based on feature points.
Figure 15:
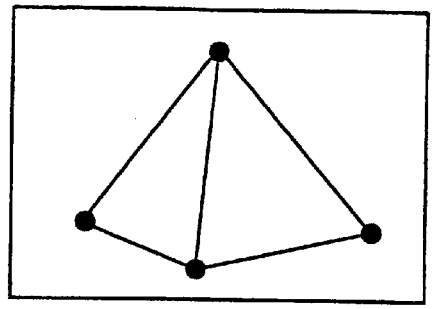
Figure 15:
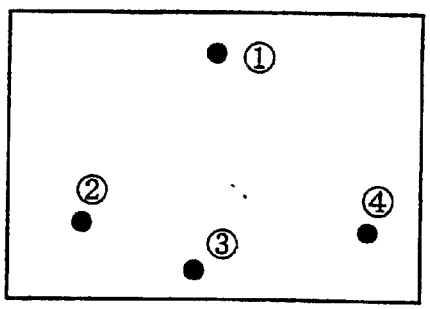
Figure 15:
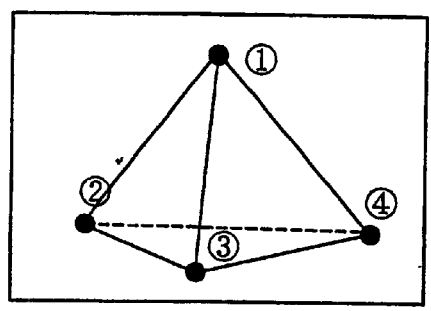
Figure 15:
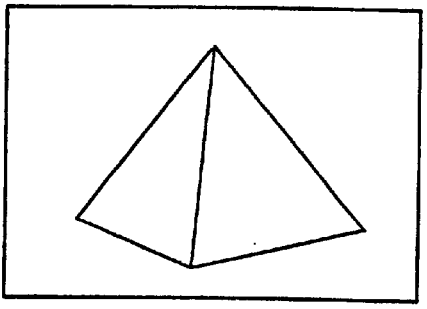
Figure 16:
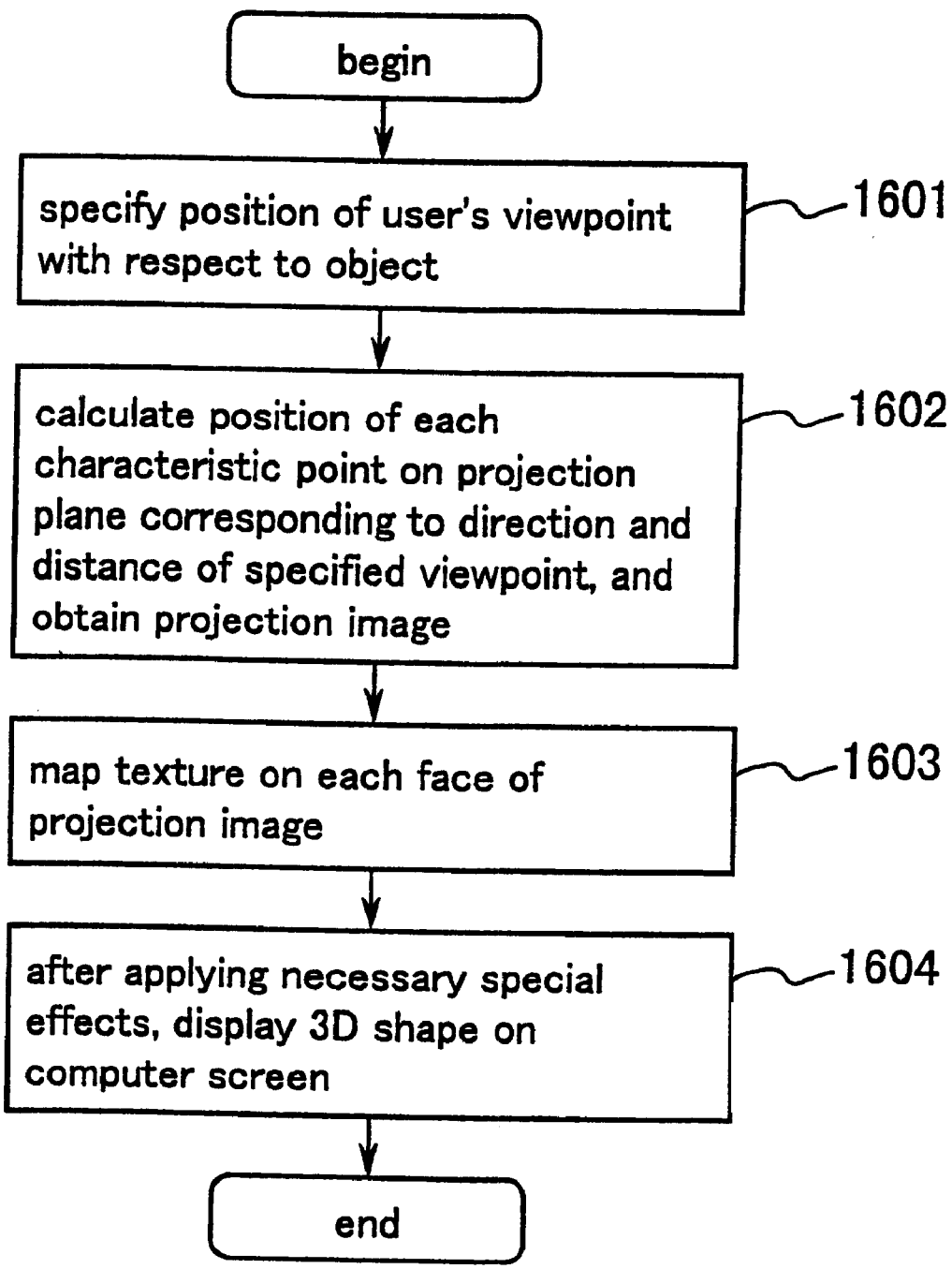
FIG. 16 is a flowchart of the 3D image generation processing operations performed on a computer screen.

Recording a program performing operations for realizing the above configurations on a computer-readable recording medium, the 3D shape generation apparatus of the present invention can be installed on any kind of computer. As shown in FIG. 13, such a recording medium, on which a program including the operations for realizing the 3D shape generation apparatus of the present invention can be not only a portable recording medium 1301 such as a CD-ROM 1302 or a flexible disk 1303, but also a recording medium 1300 in a recording apparatus on a network or a recording medium 1305 such as a hard disk or a RAM of a computer. When executing the program, the program is loaded into a computer 1304 and executed in its main memory.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A 3D shape generation apparatus, which restores and generates a 3D shape on a computer screen, based on data of feature points derived from a 3D shape and 2D image data of an outer surface of the 3D shape, the 3D shape generation apparatus comprising:

an input portion for inputting feature point information, capturing direction information, and visibility information, which represents the relation between a capturing direction and feature points that are visible from the capturing direction and appear in the captured image;

a feature point placement portion for placing the feature points in a virtual space, based on the feature point information;

a visible face assigning portion for assigning faces to the feature points that are visible from the capturing direction so that the feature points stay visible, based on the capturing direction information and the visibility information; and a 3D shape output portion for outputting and displaying a 3D shape that has faces assigned by said visible face assigning portion as its outer surface.

2. The 3D shape generation apparatus of claim 1, wherein, for the assigning of faces with said visible face assigning portion, for the faces assigned to the feature points that are visible from a capturing direction, lines are drawn from the capturing direction from which the feature points are visible to the feature points;

if the drawn lines intersect with an assigned face, the intersecting face is removed;

only faces with which the drawn lines do not intersect remain and are output by the visible face assigning portion.

3. The 3D shape generation apparatus of claim 1, wherein, for the assigning of faces with the visible face assigning portion, faces of a Delaunay diagram of the feature points that are visible from the capturing direction are assigned.

4. The 3D shape generation apparatus of claim 2, wherein, for the assigning of faces with the visible face assigning portion, faces of a Delaunay diagram of the feature points that are visible from the capturing direction are assigned.

5. A 3D shape generation apparatus, which restores and generates a 3D shape on a computer screen, based on data of feature points derived from a 3D shape and 2D image data of an outer surface of the 3D shape, the 3D shape generation apparatus comprising:

an input portion for inputting feature point information, capturing direction information, and visibility information, which represents the relation between a capturing direction and feature points that are visible from the capturing direction and appear in the captured image;

a feature point placement portion for placing the feature points in a virtual space, based on the feature point information;

a convex hull solid formation portion for forming a convex hull solid using the feature points;

a sight-obstructing solid part eliminating portion for eliminating parts of the solid that cover feature points that are visible from a capturing direction, based on the capturing direction information and the visibility information; and a 3D shape output portion for taking the solid remaining after the elimination with said sight-obstructing solid part eliminating portion as the 3D shape and outputting and displaying the 3D shape.

6. A 3D shape generation apparatus, which restores and generates a 3D shape on a computer screen, based on data of feature points derived from a 3D shape and 2D image data of an outer surface of the 3D shape, the 3D shape generation apparatus comprising:

an input portion for inputting feature point information, capturing direction information, and masking image information, which represents a capturing direction and a projected shape of an outer perimeter of the 3D shape seen from the capturing direction;

a 3D masking portion, which first generates a solid block aggregation filling a virtual space with basic solid blocks, and, based on the capturing direction information and the masking image information, eliminates basic solid blocks from the solid block aggregation that are outside the perimeter indicated by the masking image information when seen from a capturing direction; and a 3D shape output portion for outputting the remaining aggregation of basic solid blocks as a 3D shape and displaying the 3D shape.

7. The 3D shape generation apparatus of claim 6, wherein the basic solid blocks use tetrahedrons of a Delaunay diagram of the 3D feature points.

8. A 3D shape generation apparatus, which restores and generates a 3D shape on a computer screen, based on data of feature points derived from a 3D shape and 2D image data of an outer surface of the 3D shape, the 3D shape generation apparatus comprising:

an input portion for inputting feature point information, capturing direction information, visibility information which represents the relation between a capturing direction and feature points that are visible from the capturing direction and appear in the captured image, and masking image information which represents a capturing direction and a projected shape expressing an outer perimeter of the 3D shape seen from the capturing direction;

a feature point placement portion for placing the feature points in a virtual space, based on the feature point information;

a 3D masking portion, which first generates a solid block aggregation filling a virtual space with basic solid blocks, and, based on the capturing direction information and the masking image information, eliminates basic solid blocks from the solid block aggregation that are outside the perimeter indicated by the masking image information when seen from a capturing direction;

a sight-obstructing solid part eliminating portion for eliminating basic solid blocks that cover feature points that are visible from a capturing direction, based on the capturing direction information and the visibility information; and a 3D shape output portion for outputting the remaining aggregation of basic solid blocks remaining after the elimination with said sight-obstructing solid part eliminating portion as a 3D shape and displaying the 3D shape.

9. The 3D shape generation apparatus of claim 8, wherein the basic solid blocks use tetrahedrons of a Delaunay diagram of the 3D feature points.

10. The 3D shape generation apparatus of claim 8, wherein, for the elimination of basic solid blocks with the sight-obstructing solid part eliminating portion, lines are drawn from the capturing direction from which the feature points are visible to the feature points;

if the drawn lines intersect with the aggregation of basic solid blocks, the intersecting basic solid blocks are removed; and only faces of basic solid blocks with which the drawn lines do not intersect remain and are output by said sight-obstructing solid part eliminating portion.

11. The 3D shape generation apparatus of claim 10, wherein the basic solid blocks use tetrahedrons of a Delaunay diagram of the 3D feature points.

12. A computer-readable recording medium storing a program for controlling a 3D shape generation computer to restore and generate a 3D shape on a computer screen, based on data of feature points derived from a 3D shape and 2D image data of an outer surface of the 3D shape, by:

inputting feature point information, capturing direction information, and visibility information, which represents the relation between a capturing direction and feature points that are visible from the capturing direction and appear in the captured image;

placing the feature points in a virtual space, based on the feature point information;

assigning faces to the feature points that are visible from the capturing direction so that the feature points stay visible, based on the capturing direction information and the visibility information; and outputting and displaying a 3D shape that has the faces assigned in the visible face assigning operation as its outer surface.

13. A computer-readable recording medium storing a program for controlling a 3D shape generation computer to restore and generate a 3D shape on a computer screen, based on data of feature points derived from a 3D shape and 2D image data of an outer surface of the 3D shape, by:

inputting feature point information, capturing direction information, and visibility information, which represents the relation between a capturing direction and feature points that are visible from the capturing direction and appear in the captured image;

placing the feature points in a virtual space, based on the feature point information;

forming a convex hull solid using the feature points;

eliminating parts of the solid that cover feature points that are visible from a capturing direction, based on the capturing direction information and the visibility information; and taking the solid remaining after the elimination with said sight-obstructing solid part eliminating portion as the 3D shape and outputting and displaying the 3D shape.

14. A computer-readable recording medium storing a program for controlling a 3D shape generation computer to restore and generate a 3D shape on a computer screen, based on data of feature points derived from a 3D shape and 2D image data of an outer surface of the 3D shape, by:

inputting feature point information, capturing direction information, and masking image information, which represents a capturing direction and a projected shape expressing an outer perimeter of the 3D shape seen from the capturing direction;

performing a 3D masking operation, which first generates a solid block aggregation filling a virtual space with basic solid blocks and, based on the capturing direction information and the masking image information, eliminates basic solid blocks from the solid block aggregation that are outside the perimeter indicated by the masking image information when seen from a capturing direction; and outputting the remaining aggregation of basic solid blocks as a 3D shape and displaying the 3D shape.

15. A computer-readable recording medium storing a program for controlling a 3D shape generation computer to restore and generate a 3D shape on a computer screen, based on data of feature points derived from a 3D shape and 2D image data of an outer surface of the 3D shape, by:

inputting feature point information, capturing direction information, visibility information which represents the relation between a capturing direction and feature points that are visible from the capturing direction and appear in the captured image, and masking image information which represents a capturing direction and a projected shape expressing an outer perimeter of the 3D shape seen from the capturing direction;

placing the feature points in a virtual space, based on the feature point information;

performing a 3D masking operation, which first generates a solid block aggregation filling a virtual space with basic solid blocks, and, based on the capturing direction information and the masking image information, eliminates basic solid blocks from the solid block aggregation that are outside the perimeter indicated by the masking image information when seen from a capturing direction;

eliminating basic solid blocks that cover feature points that are visible from a capturing direction, based on the capturing direction information and the visibility information; and outputting the remaining aggregation of basic solid blocks remaining after the elimination with said sight-obstructing solid part eliminating portion as a 3D shape and displaying the 3D shape.

* * * * *